United States Patent Office 3,139,847
Patented July 7, 1964

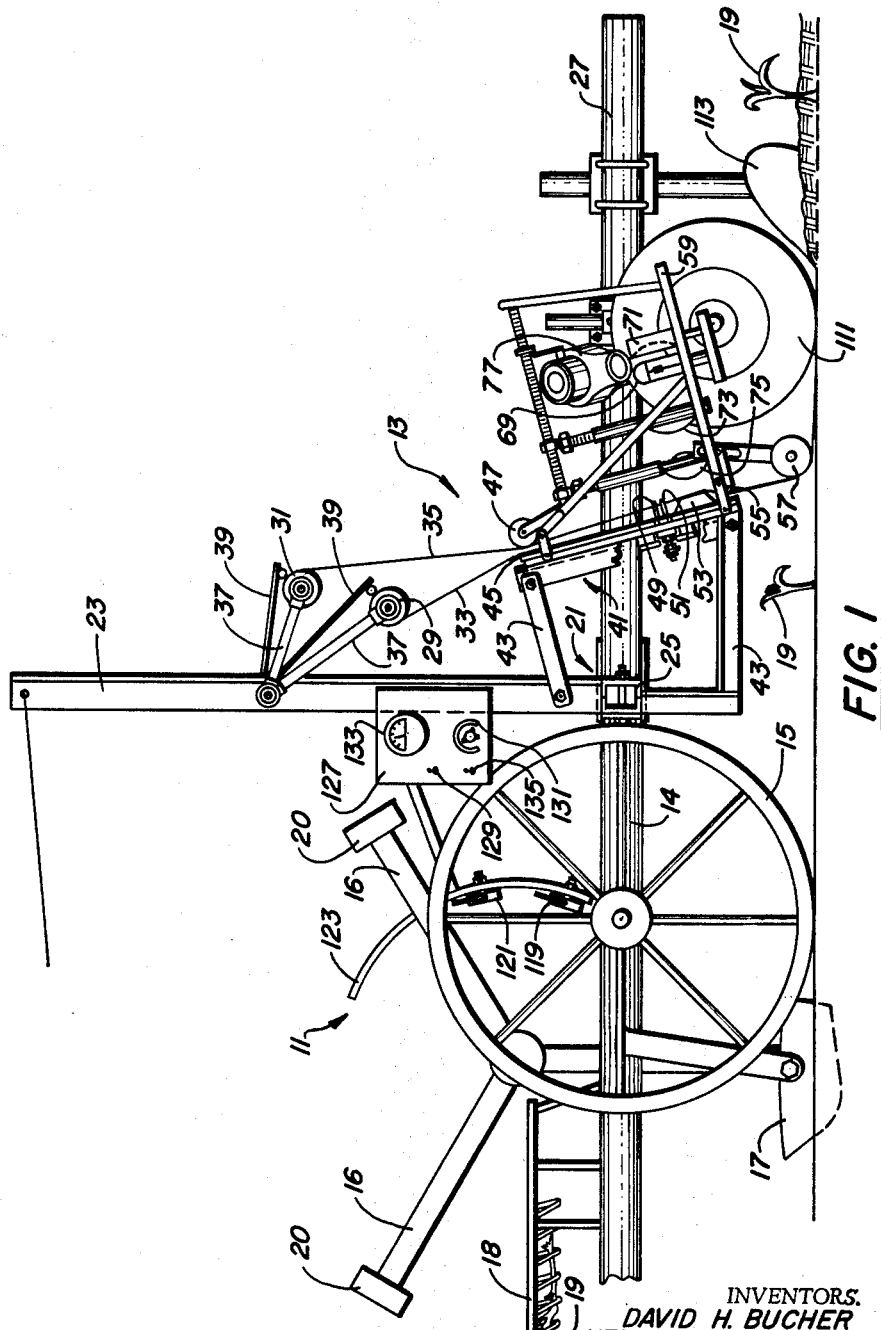

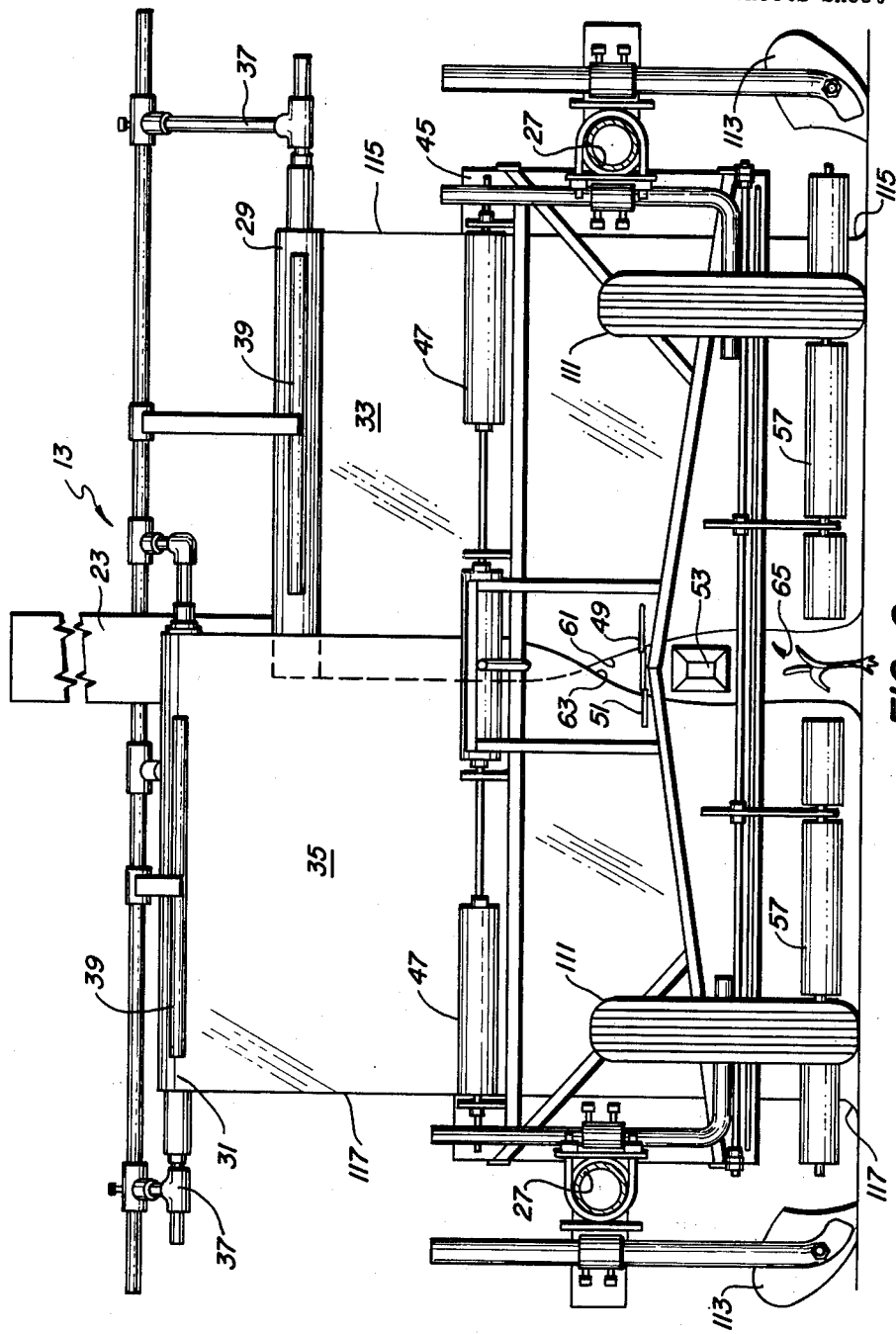

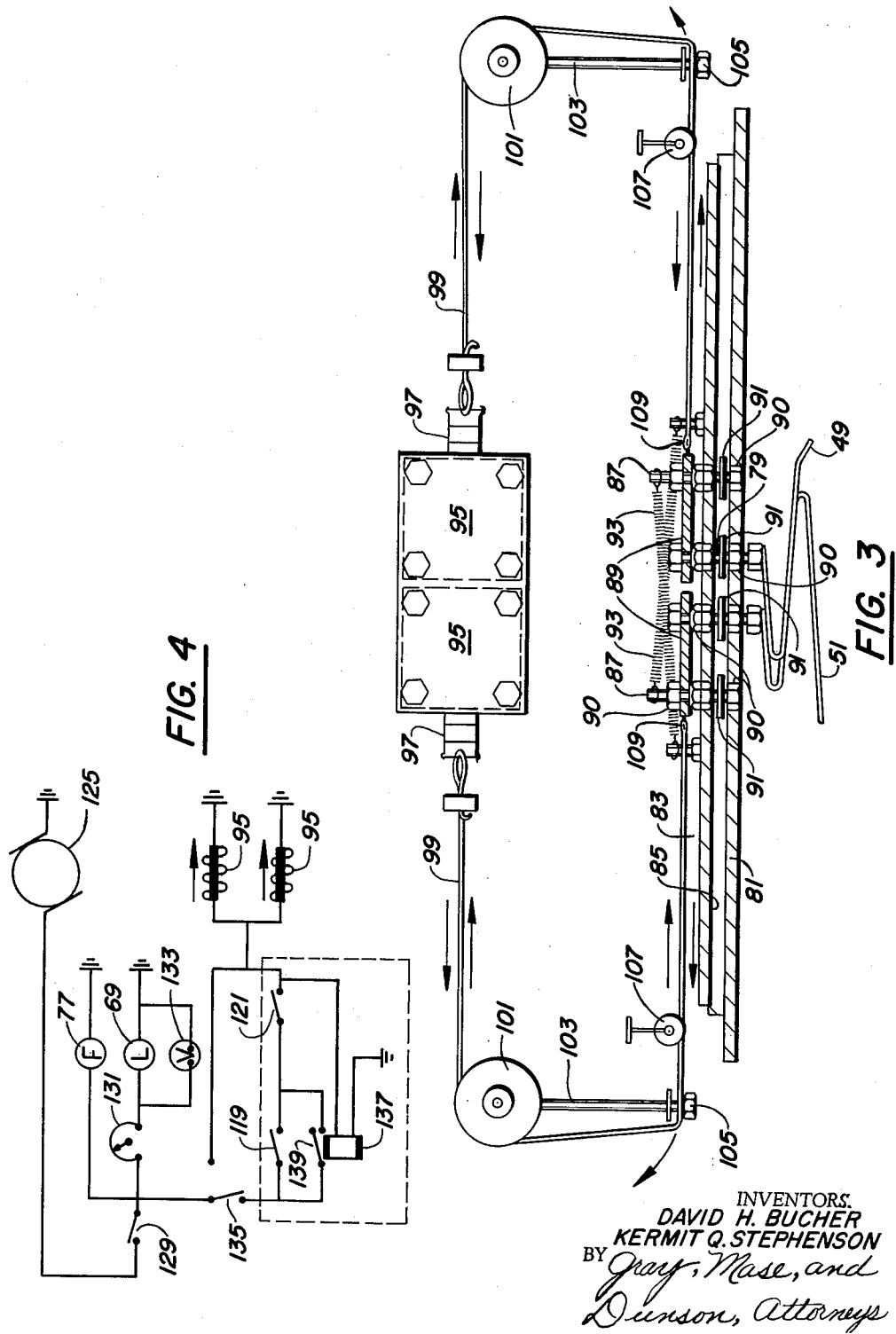

3,139,847
TRANSPLANTER MULCHER
David H. Bucher, 142 Blaine Road, R.D. 1, Waterloo, Iowa, and Kermit Q. Stephenson, 1127 S. Garner St., State College, Pa.
Filed Aug. 1, 1962, Ser. No. 214,129
8 Claims. (Cl. 111—3)

This invention relates to apparatus for planting young plants and placing a layer of mulch around the plants. More particularly, this invention includes apparatus that plants seedlings or seeds and lays down a plastic film as mulch in one mechanized operation.

Considerable evidence has been found that polyethylene film used as a mulch is beneficial to crops such as tomatoes, peppers, beans, cucumbers, strawberries, and melons. The benefits of mulch vary for different crops and different geographic locations but, in general, mulching of crops with, for example, 1 mil or 1.5 mil thickness of polyethylene film aids in: accelerating crop maturity and increasing crop yields, weed control, retention of soil moisture and erosion control, preservation of nutrients in soil and improving quality of fruit by reducing plant disease and insect damage. However, the most important factor is the earliness of crop maturity, which enables the grower to get the higher prices and the increased income resulting from more and better products.

The use of mechanical transplanters for field planting of seedlings has been accepted practice for many years. Presently, there are available commercial film applicators for applying mulching material. However, applying polyethylene film in conjunction with the transplanting operation has been rather cumbersome because of the necessary hand labor. If the film is applied ahead of the transplanter, it necessitates developing a means of punching or cutting a hole in the film and planting through this hole. With this method, it is difficult to obtain adequate compaction of the soil around the root zone of the plants when the plant is placed in a hole "punched" in the soil after the film is laid. Also, compaction of soil after the film is applied tends to puncture the film and pull the outer edges of the film inward. The film is then susceptible to wind damage because of looseness.

The apparatus of this invention functions in the following manner. The basic components of a commercial transplanter are used to place the plants at predetermined interspaced intervals in a row along the line of progress of the planter, assuring good compaction of soil around the plant roots. Immediately behind the planter press wheels, or compaction wheels, two rolls of plastic mulching material are dispensed through a system of guides to provide an overlapping of the two layers of film at a point directly in line with the plants. The outer edges of the film are secured by a system of small plows and press wheels. Prior to securing the outer edges, the overlapping edges of the film are heat-sealed together, and thus provide a continuous layer of film between the plants. In order to provide appropriate openings in the film for the plants, an electrically synchronized control mechanism is provided for simultaneously discontinuing the sealing and for separating the film at the appropriate time to allow the film to be placed "around" the plants.

In the preferred form of the invention, the sealing mechanism includes a radiant energy source and an optical system for condensing the emitted energy so that a beam of radiant heat is projected onto the overlapping film edges. This form of sealing makes it possible to control the sealing rate corresponding with ground speed by adjusting the voltage supplied to the radiant energy source.

Among the advantages of this invention already apparent are a reliable method of heat sealing, mechanical simplicity, and economy. Other advantages include savings in labor, the ability of the apparatus to mulch "around" plants with a large leaf area, and ease of operation. Still other advantages of the invention are apparent from the following specification, the drawings, and the claims hereinafter set forth.

In the drawings:

FIG. 1 is a side elevational view of the apparatus of the invention having a portion removed for clarity;

FIG. 2 is a end view of the apparatus with the heat-sealing mechanism removed for clarity;

FIG. 3 is an enlarged view of the film-separating mechanism; and

FIG. 4 is a diagram of the electrical control circuit.

Referring to FIGS. 1 and 2, the transplanter mulcher apparatus includes a transplanter 11 and the mulch applying apparatus 13. Only the necessary parts of the transplanter 11 are shown which are the transplanter main support member 14, the transplanter compaction or packer wheel 15 (only one shown), the transplanter plant arms 16—16, the transplanter plow 17 and the plant tray 18.

The transplanter portion or transplanting apparatus 11 functions in the conventional manner by ensuring that the young plants 19 are properly placed in the soil. The plow 17 first opens a narrow trench. An operator riding on the planter places a young plant 19 in the plant tray 18. A planter arm having a pair of plant holders 20—20 (preferably of soft material such as rubber) picks the plant 19 out of the plant tray 18 and passes between the blades of the plow 17 releasing the plant 19 as it is inserted into the narrow trench formed by the plow 17. The plow 17 is shaped so that the trench it forms tends to close in behind the plow 17. The soil is additionally pushed around the plant 19 by the compaction wheels 15—15 which straddle the trench and force the trench closed packing the soil firmly around the plant. The result is that the plants are positioned at predetermined spaced intervals in a row along the line of progress of the planting apparatus.

The particular form of transplanter as shown and described herein is shown only as an example of a transplanter that is workable and adaptable to the mulch applying apparatus. However, other forms of transplanters may be used in the combination of this invention.

The frame 21 of the mulch applying apparatus 13 is attached to the transplanter main support member 14. The main components of the mulcher frame 21 are a vertical frame member 23, a cross member 25 and two horizontal bars 27—27 (only one is shown in FIG. 1) attached to cross member 25.

Two separate rolls 29 and 31 pay out sheets 33 and 35 of mulching material, respectively, and are mounted on adjustable supports 37—37 that are attached to the vertical frame member 23. Tension on the plastic sheets 33 and 35 is maintained by a drag bar 39 that bears on each of the film rolls 29 and 31.

After leaving the film rolls 29 and 31, the film sheets 33 and 35 pass through a guide assembly 41 that is attached to the frame 21 of the mulcher 13 by suitable support arms 43—43. The guide assembly 41 includes a guide plate 45, upper control rollers 47—47, film separating fingers 49 and 51, a pressure ramp 53, a film pressure rod 55, and lower control rollers 57—57. The upper control rollers 47—47, film pressure rod 55 and lower control rollers 57—57 are attached to the heat sealing system support 59 and are adjustable to control the tension of the film sheets 33 and 35.

As shown in FIG. 2, the mulch sheet such as plastic film sheets 33 and 35 leave the rolls 29 and 31 and pass between the film guide plate 45 and upper control roller 47, with their inner edges 61 and 63 overlapping. The greatest percentage of the film sheets 33 and 35 that passes through the guide assembly 41 will have the overlapping edges 61 and 63 sealed together on the pressure ramp 53. At selected positions, however, the film separating fingers 49 and 51 are activated to produce a gap 65 between the film sheets that fit around a plant 19. The overlapping edges 61 and 63 are kept aligned with the row of plants 19—19 as the mulch sheets 33 and 35 pass beneath the lower control rollers 57—57.

The preferred form of sealing system is an optical system shown in FIG. 1 mounted on the sealing system support 59. The optical system is comprised of an energy source such as a tungsten filament lamp 69, a reflector 71, and a pair of condensing lenses 73 and 75. A beam of radiant energy or heat is concentrated on the film sheets 33 and 35 as they pass over the pressure ramp 53 which seals the overlapped edges 61 and 63 together. A fan 77 is provided to keep the lamp 69 cool and prolong its service life.

FIG. 3 is a view of the film separating mechanism that interrupts the sealing process and produces the gap 65 between the film sheets 33 and 35. The film separating fingers 49 and 51 are in the form of hooks with separating finger 49 passing around the edge 61 of sheet 33 and separating finger 51 pass around the edge 63 of sheet 35. The fingers 49 and 51 are constructed and mounted to move in opposite directions and as they are moved they pull the edges 61 and 63 apart to produce the the gap 65.

The fingers 49 and 51 are each attached to a pin 79 that passes through two plates 81 and 83 having a space or slot 85 between the plates 81 and 83. Each pin 79 is attached to a similar pin 87 by a guide bar 89. Pin 87 also passes through plates 81 and 83. The pins 79—79 and 87—87 are held in place on the plates 83 and 85 by suitable fasteners 90—90 but are free to move or slide in a transverse direction. The pins 79—79 and 87—87 are provided with rollers 91—91 that are confined in the slot 85 and aid the pins 79—79 and 87—87 in moving freely back and forth in the slot 85. Each pin 87 is provided with a spring 93 that urges the pins 79—79 toward each other.

The film separating actuator includes a pair of solenoids 95—95 having their plungers 97—97 connected to a wire or rope 99. Each rope 99 passes over a roller 101 having an arm 103, over a guide roller 107 and is connected to a loop 109 on the guide bar 89. The roller 101 and arm 103 provide a mechanical advantage so that a short movement of the plunger 97 causes a rapid and greater movement of the guide bar 89. Activation of the solenoids 95—95 causes a rapid movement of the fingers 49 and 51 away from each other pulling the edges 61 and 63 of film sheets 33 and 35 apart.

The film sheets 33 and 35 are either bonded together on the pressure ramp 53 (if the fingers 49 and 51 are together) or a gap 65 is formed between the two sheets 33 and 35 (when the fingers 49 and 51 are apart) before they pass beneath the lower control roller 57. After the sheets pass beneath the lower control roller 57, they are held tight to the soil by press wheels 111—111 that are mounted on the horizontal bars 27—27 of the mulcher 13. Also mounted on the horizontal bars 27—27 are plows 113—113 that push earth over the outside edges 115 and 117 of the plastic sheets 33 and 35 anchoring the sheets to the ground. Thus a layer of mulch is deposited on the soil around the plants 19—19.

The position of the fingers 49 and 51 (whether they are together or apart) is controlled by the activation of two microswitches 119 and 121 mounted on a curved bar 123 that is adjacent to the planter arm 16, both curved bar 123 and microswitches 119 and 121 being adjustable for length and spacing of sealed and unsealed portions to be synchronized with plant spacing and sealing as desired. As the plant arm 16 moves, it passes over the microswitches 119 and 121 activating them, and the microswitches 119 and 121, in turn, activate the solenoids 95—95.

FIG. 4 is a schematic diagram of the electrical circuit that controls the optical sealing system and film separating mechanism. The power for the various components is obtained from a suitable source, such as a tractor engine driven, or separately driven generator 125. The control panel 127 for the electric circuit is mounted on vertical frame member 23 shown in FIG. 1. A main switch 129 activates the fan 77 and supplies current to a rheostat 131. The rheostat 131 is used to control the voltage supplied to the lamp 69 and the voltage is determined by a voltmeter 133 connected across the lamp 69. Main switch 129 also supplies current to a switch 135 which has two positions. In one position, the switch 135 connects to the solenoids 95—95 directly to the power source 125. In the automatic position, the switch 135 connects the solenoids 95—95 to the power source through microswitch 119 and 121. Microswitch 119 is normally open and microswitch 121 is normally closed. When the plant arm 16 contacts microswitch 119, the switch 119 is closed and activates the solenoids 95—95 through normally closed microswitch 121. At the same time, a relay 137 is activated and closes points 139. When points 139 are closed, the current bypasses microswitch 119 so that when switch 119 returns to its normally open position, the solenoids 95—95 remain activated. The arm 16 moves further and contacts normally closed microswitch 121, opening switch 121 and interrupting the current to the relay 137 and solenoids 95—95. The solenoid circuit thus remains open until microswitch 119 is activated again. The solenoids 95—95, and consequently the fingers 49 and 51, are activated for the time period that it requires for the plant arm 16 to pass over and between the microswitches 119 and 121. The switches 119 and 121 are positioned so that the film separations or gaps 65 are created at a proper time to allow for plant 19 passage.

Although other sealing mechanisms and systems are possible, such as heated irons, rollers, or shoes, and are included within the scope of this invention, the optical system described herein is preferred from a standpoint of operational ease, cost, and reliability. The sealing system is affected very little by ambient temperature changes and is especially adapted for control of sealing rate. Other types of sealing mechanisms, not having the control features of the optical system, tend to burn through or tear the plastic sheets. As an example of the flexibility of the preferred optical system, the tables included below indicate that the lamp voltage for lamps of different size may be determined and set according to the sealing rate desired and the type of material used as a mulch.

TABLE 1

*Comparison of Sealing Rates for a 300-Watt Lamp Using 1 Mil Black Polyethylene Film*

| Lamp Voltage (volts) | Sealing Rate 300-Watt Lamp (ft./min.) | Sealing Rate 500-Watt Lamp (ft./min.) |
|---|---|---|
| 80 | 8.8 | 25.8 |
| 90 | 11.4 | 31.7 |
| 100 | 14.3 | 36.4 |
| 110 | 22.5 | 39.7 |
| 120 | 27.6 | 43.5 |

TABLE 2

*Comparison of Sealing Rates for 1 Mil Black Polyethylene Film and 1.5 Mil Black Polyethylene Film Using a 500-Watt Lamp*

| Lamp Voltage (volts) | Sealing Rate 1 mil Film (ft./min.) | Sealing Rate 1.5-mil Film (ft./min.) |
| --- | --- | --- |
| 80 | 25.8 | 14.1 |
| 90 | 31.7 | 18.2 |
| 100 | 36.4 | 22.5 |
| 110 | 39.7 | 27.6 |
| 120 | 43.5 | 32.6 |

The above sealing rates are established by the manually controlled rheostat 131 and depend, of course, on tractor speed or transplanting rate. Such control is practically impossible with many other forms of sealing mechanism unless very complete and expensive controls are included for such purposes.

It will be understood, of course, that, while the form of the invention herein shown and described constitutes the preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts may be substituted without departing from the spirit or scope of the invention herein disclosed.

What is claimed is:

1. Apparatus for planting and depositing mulch around plants comprising, in combination:
   (a) a frame structure adapted to be moved across the soil;
   (b) a planting station on said frame for depositing plants in the soil;
   (c) a supply of mulch sheets carried on said frame;
   (d) guide means on said frame to align said mulch sheets for deposition upon the soil with their edges overlapping and with the overlapped portion aligned with the plants deposited by said planting station;
   (e) means mounted on said frame, synchronized with the speed of advance of the apparatus, for sealing the overlapping edges of said mulch sheets between said plants.

2. Apparatus for planting and depositing mulch around plants comprising, in combination:
   (a) a frame structure adapted to be moved across the soil;
   (b) a planting station on said frame for depositing plants in the soil at predetermined spaced intervals in a row along the line of progress of the apparatus;
   (c) a supply of mulch sheets carried on said frame;
   (d) guide means on said frame to align said mulch sheets for deposition upon the soil with their edges overlapping and with the overlapped portion aligned with the plants deposited by said planting station;
   (e) means on said frame for sealing said overlapping edges of said mulch sheets; and
   (f) means mounted on said frame for interrupting the sealing whereby said overlapping edges of said mulch sheets are sealed between said plants and unsealed at said plants.

3. Apparatus for planting and depositing mulch around plants comprising, in combination:
   (a) a frame structure adapted to be moved across the soil;
   (b) a planting station on said frame for depositing plants in the soil at predetermined spaced intervals in a row along the line of progress of the apparatus;
   (c) a supply of mulch sheets carried on said frame;
   (d) guide means on said frame to align said mulch sheets for deposition upon the soil with their edges overlapping and with the overlapped portion aligned with the plants deposited by said planting station;
   (e) means on said frame for heat-sealing said overlapping edges of said mulch sheets, including a source of radiant energy focused on the edges of said mulch sheets for heating the edges to a temperature sufficient to fuse the sheets and seal them together; and
   (f) means operated by said planting station to separate said overlapping edges of said mulch sheets before said overlapping edges are heat-sealed in correlated sequence to said interspaced intervals of plants so that said mulch sheets are deposited on the soil unsealed and around the position of said plants and are deposited on the soil sealed between said plants.

4. Apparatus for planting and depositing mulch around plants comprising, in combination:
   (a) a frame structure adapted to be moved across the soil;
   (b) a planting station on said frame for depositing plants in the soil at predetermined spaced intervals in a row along the line of progress of the apparatus;
   (c) a supply of mulch sheets carried on said frame;
   (d) guide means on said frame to align said mulch sheets for deposition upon the soil with their edges overlapping and with the overlapped portion aligned with the plants deposited by said planting station;
   (e) means on said frame for heat-sealing said overlapping edges of said mulch sheets, including a source of radiant energy focused on the edges of said mulch sheets for heating the edges to a temperature sufficient to fuse the sheets and seal them together;
   (f) a pair of movable fingers mounted on said frame that engage the edges of said mulch sheets and on movement of said fingers in opposite directions move the edges of said mulch sheets out of overlapping relationship before they are sealed; and
   (g) means activated by said planting station for moving said pair of movable fingers in opposite directions in correlated sequence to said interspaced intervals so that said mulch sheets are deposited on the soil unsealed and around the position of said plants and are deposited on the soil sealed between said plants.

5. Apparatus for planting and depositing mulch around plants comprising, in combination:
   (a) a frame structure adapted to be moved across the soil;
   (b) a planting station on said frame for depositing plants in the soil at predetermined spaced intervals in a row along the line of progress of the apparatus;
   (c) a supply of mulch sheets carried on said frame;
   (d) guide means on said frame to align said mulch sheets for deposition upon the soil with their edges overlapping and with the overlapped portion aligned with the plants deposited by said planting station;
   (e) means on said frame for heat-sealing said overlapping edges of said mulch sheets, including a source of radiant energy focused on the edges of said mulch sheets for heating the edges to a temperature sufficient to fuse the sheets and seal them together;
   (f) a pair of movable fingers that engage the edges of said mulch sheets and on movement of said fingers in opposite directions move the edges of said mulch sheets out of overlapping relationship before they are sealed;
   (g) means activated by said planting station for moving said pair of movable fingers in opposite directions in correlated sequence to said interspaced intervals so that said mulch sheets are deposited on the soil unsealed and around the position of said plants and are deposited on the soil sealed between said plants; and
   (h) a pair of plows on said frame positioned to move earth onto the outside edges of said mulch sheets after they are deposited on the ground.

6. Apparatus for planting and depositing mulch around plants comprising, in combination:
 (a) a frame structure adapted to be moved across the soil;
 (b) a planting station on said frame for depositing plants in the soil at predetermined spaced intervals in a row along the line of progress of the apparatus;
 (c) a supply of mulch sheets carried on said frame;
 (d) guide means on said frame including a first guide roller and a second roller for depositing said mulch sheets flat upon the soil with adjacent edges of said mulch sheets overlapping and aligned with said plants;
 (e) a pair of movable fingers between said first guide roller and said second guide roller, said fingers positioned to engage the edges of said mulch sheets and, on movement of said fingers in opposite directions, move the edges of said mulch sheets out of overlapping relationship;
 (f) a pressure ramp between said movable fingers and said second guide roller positioned to press against the overlapping edges of said mulch sheets and maintain said edges in close contact;
 (g) a source of heat including a lamp, reflector, and lenses for focusing a beam of radiant energy on said pressure ramp and sealing the overlapped edges of said mulch sheets; and
 (h) a pair of solenoids, activated by said planting station and connected to said movable fingers, said solenoids moving said fingers in opposite directions in correlated sequence to said interspaced intervals to prevent sealing of said overlapped edges at said pressure ramp so that said mulch sheets are deposited on the soil unsealed around the position of said plants and are deposited on the soil sealed between said plants.

7. Apparatus for planting and depositing mulch around plants comprising, in combination:
 (a) a frame structure adapted to be moved across the soil;
 (b) a planting station on said frame for depositing plants in the soil at predetermined spaced intervals in a row along the line of progress of the apparatus;
 (c) a supply of mulch sheets carried on said frame;
 (d) guide means on said frame including a first guide roller and a second roller for depositing said mulch sheets flat upon the soil with adjacent edges of said mulch sheets overlapping and aligned with said plants;
 (e) a pair of movable fingers between said first guide roller and said second guide roller, said fingers positioned to engage the edges of said mulch sheets and, on movement of said fingers in opposite directions, move the edges of said mulch sheets out of overlapping relationship;
 (f) a pressure ramp between said movable fingers and said second guide roller positioned to press against the overlapping edges of said mulch sheets and maintain said edges in close contact;
 (g) a source of heat including a lamp, reflector, and lenses for focusing a beam of radiant energy on said pressure ramp and sealing the overlapped edges of said mulch sheets;
 (h) a pair of solenoids, activated by said planting station and connected to said movable fingers, said solenoids moving said fingers in opposite directions in correlated sequence to said interspaced intervals to prevent sealing of said overlapped edges at said pressure ramp so that said mulch sheets are deposited on the soil unsealed around the position of said plants and are deposited on the soil sealed between said plants; and
 (i) a rheostat connected in the circuit to said lamp for adjusting the energy level of said beam of radiant energy.

8. Apparatus for planting and depositing mulch around plants comprising, in combination:
 (a) a frame structure adapted to be moved across the soil;
 (b) a planting station on said frame for depositing plants in the soil at predetermined spaced intervals in a row along the line of progress of the apparatus;
 (c) a supply of mulch sheets carried on said frame;
 (d) guide means on said frame including a first guide roller and a second roller for depositing said mulch sheets flat upon the soil with adjacent edges of said mulch sheets overlapping and aligned with said plants;
 (e) a pair of movable fingers between said first guide roller and said second guide roller, said fingers positioned to engage the edges of said mulch sheets and, on movement of said fingers in opposite directions, move the edges of said mulch sheets out of overlapping relationship;
 (f) a pressure ramp between said movable fingers and said second guide roller positioned to press against the overlapping edges of said mulch sheets and maintain said edges in close contact;
 (g) a source of heat including a lamp, reflector, and lenses for focusing a beam of radiant energy on said pressure ramp and sealing the overlapped edges of said mulch sheets;
 (h) a pair of solenoids, activated by said planting station and connected to said movable fingers, said solenoids moving said fingers in opposite directions in correlated sequence to said interspaced intervals to prevent sealing of said overlapped edges at said pressure ramp so that said mulch sheets are deposited on the soil unsealed around the position of said plants and are deposited on the soil sealed between said plants;
 (i) a rheostat connected in the circuit to said lamp for adjusting the energy level of said beam of radiant energy;
 (j) a pair of pressure wheels on said frame for pressing said mulch sheet onto the soil as said sheets pass from said second guide roller; and
 (k) a pair of plows on said frame positioned to move soil onto the outside edges of said mulch sheets after said mulch sheets are deposited on the ground.

References Cited in the file of this patent
UNITED STATES PATENTS

| | | |
|---|---|---|
| 1,882,377 | Whittelsey | Oct. 11, 1932 |
| 1,910,289 | Hoag | May 23, 1933 |
| 2,708,812 | Nakar | May 24, 1955 |
| 2,740,233 | Reynolds | Apr. 3, 1956 |
| 2,890,665 | Kang | June 16, 1959 |
| 3,005,425 | Saifuku | Oct. 24, 1961 |
| 3,040,154 | Marsh | June 19, 1962 |